Feb. 23, 1937.  I. E. SNEVA  2,071,664
FRUIT PITTING MACHINE
Filed Aug. 30, 1934  4 Sheets-Sheet 2
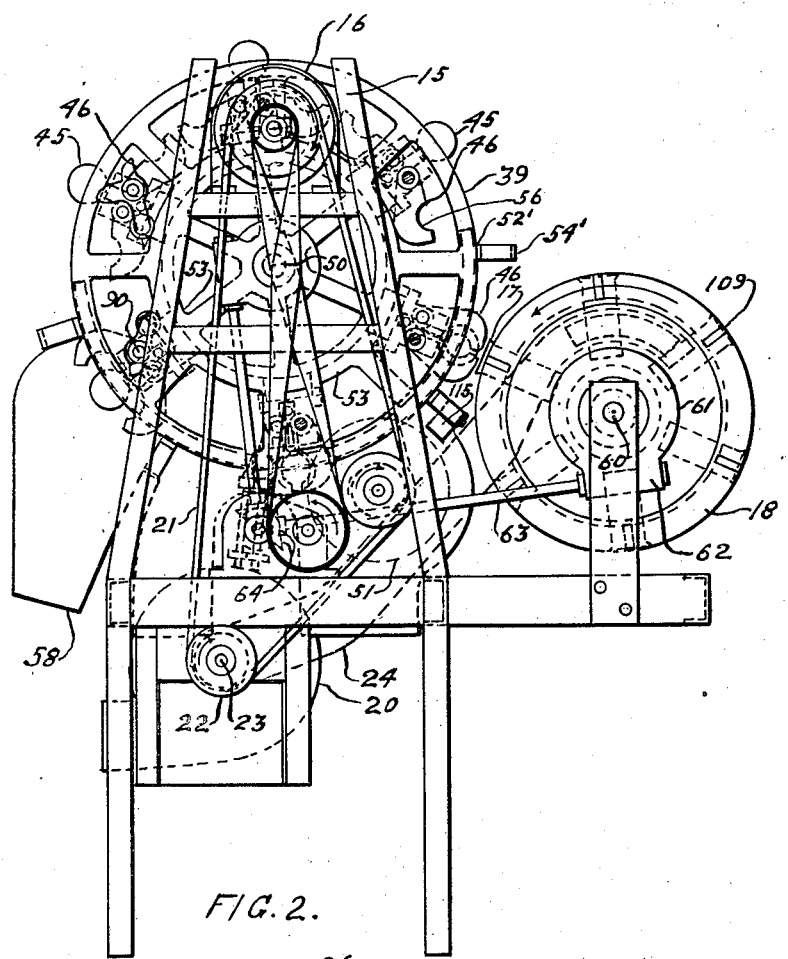
FIG. 2.
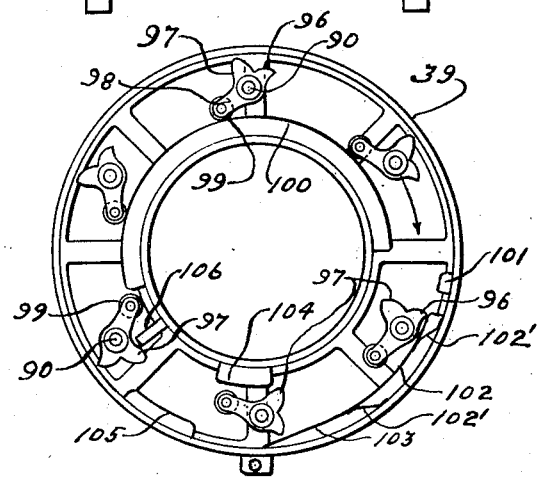
FIG. 3.
INVENTOR
INGOLF E. SNEVA
BY E. J. Andrews
ATTY.

Feb. 23, 1937.   I. E. SNEVA   2,071,664
FRUIT PITTING MACHINE
Filed Aug. 30, 1934   4 Sheets-Sheet 3

INVENTOR
INGOLF E. SNEVA
BY E. J. Andrews
ATTY.

Feb. 23, 1937. I. E. SNEVA 2,071,664

FRUIT PITTING MACHINE

Filed Aug. 30, 1934 4 Sheets-Sheet 4

INVENTOR
INGOLF E. SNEVA
BY E. J. Andrews
ATTY.

Patented Feb. 23, 1937

2,071,664

UNITED STATES PATENT OFFICE 2,071,664

FRUIT PITTING MACHINE

Ingolf E. Sneva, Chicago, Ill., assignor to Ideal Machine Company, Chicago, Ill., a corporation of Illinois Application August 30, 1934, Serial No. 742,036

15 Claims. (Cl. 146—28)

This invention relates to fruit pitters, and it has for its general object providing suitable mechanism for the removal of the pits or stones from peaches, apricots or other fruits, in a very efficient, rapid and satisfactory manner. A particular object is to provide suitable mechanism for feeding the fruit to the pitting mechanism. Another object is to provide improved means for handling the fruit during the process of cutting and pitting. Another object is to provide improved knives for operating on the fruit and suitable mechanism for operating the knives. Another object is to provide an improved method for removing the pits from the fruit after it has been suitably operated on; and to provide suitable knives and suitable method for operating the knives for carrying out the pitting process. Other objects of the invention will be apparent from a consideration of the accompanying drawings and the following description thereof.

Figure 1:
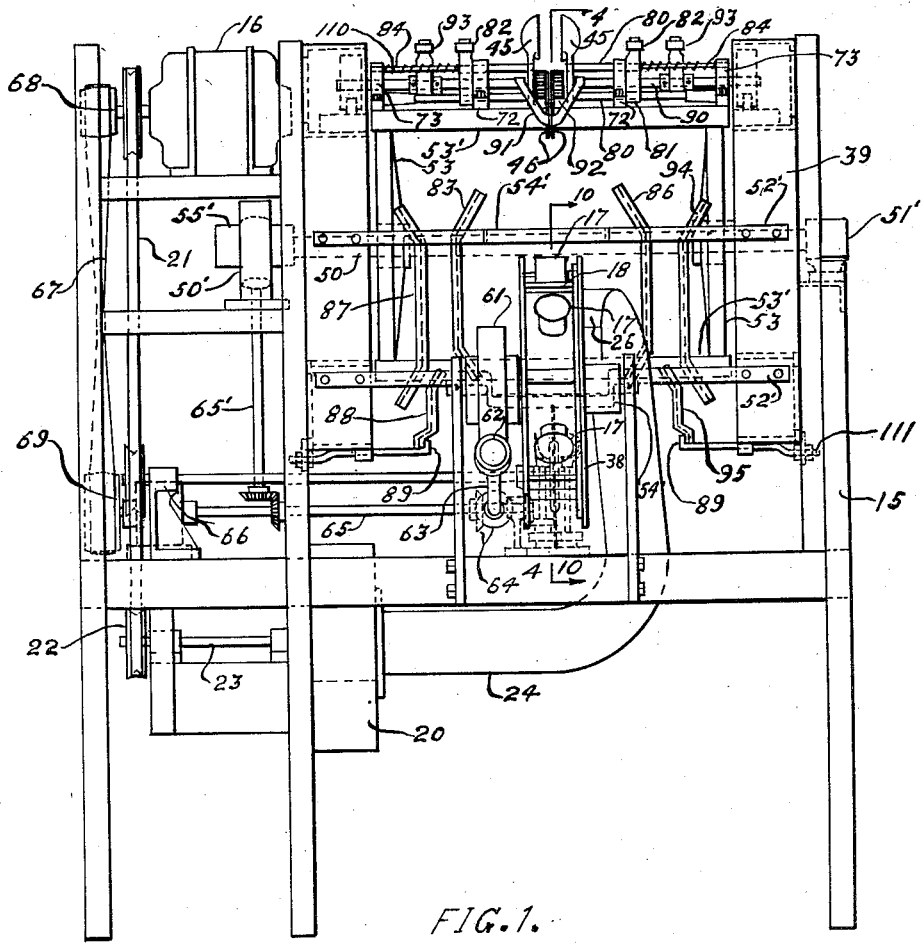
Figure 4:
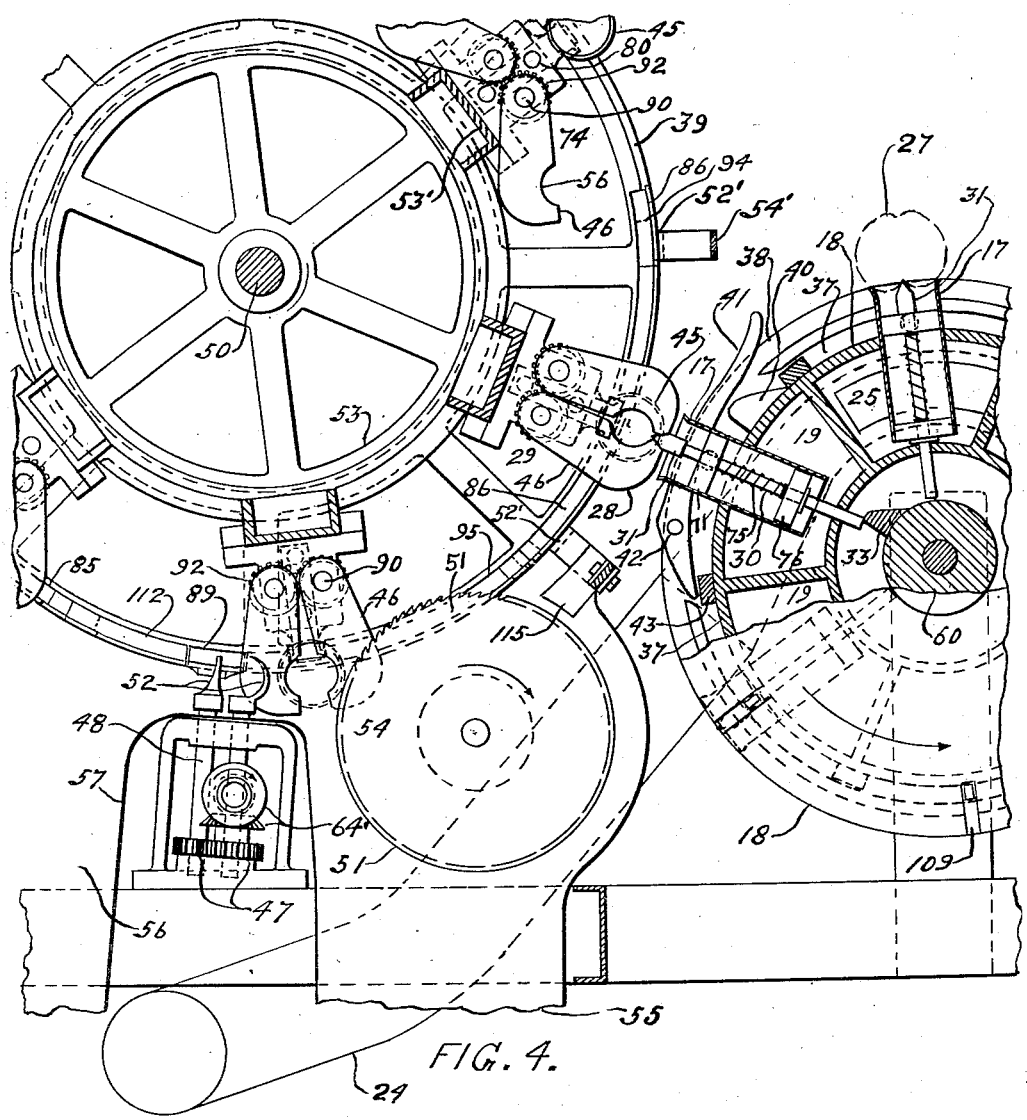
Figure 5:
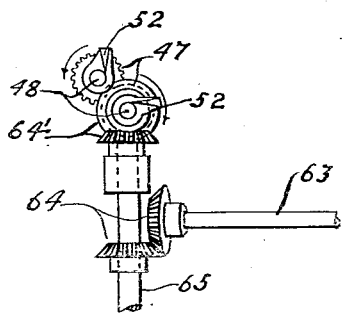
Figure 10:
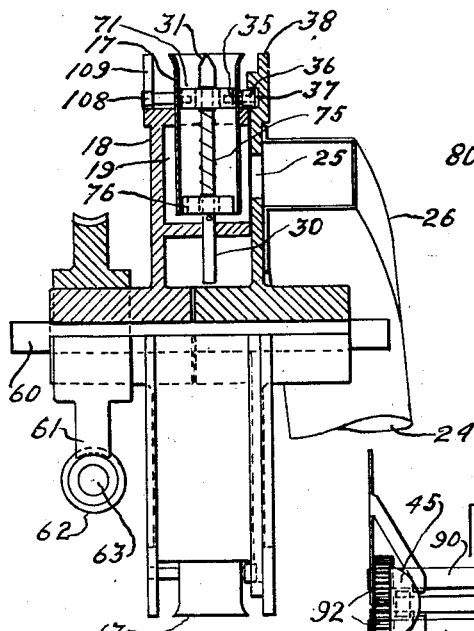
Figures 8, 9:
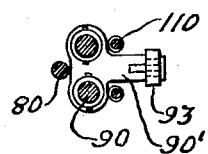
Figure 11:
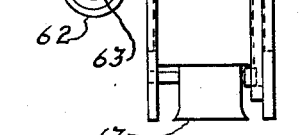
Figures 6, 7:
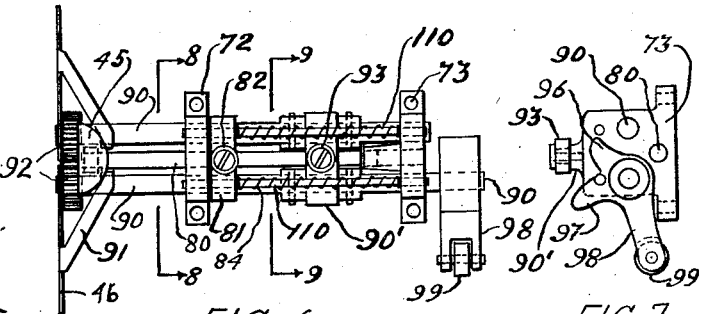
Figure 11:
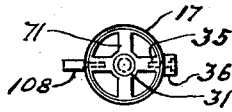
Figure 12:
Figure 13:
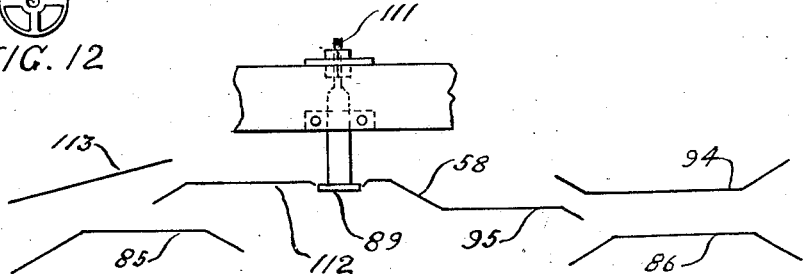

Of the drawings, Fig. 1 is an elevation of a machine which embodies the features of my invention, with certain duplicate parts omitted for clearness; Fig. 2 is a side elevation of the machine; Fig. 3 is an elevation of a cam wheel of the machine; Fig. 4 is an enlarged sectional view along the line 4—4 of Fig. 1; Fig. 5 is a plan view of the pit removing knives and the operating mechanism therefor; Fig. 6 is an enlarged plan view of a portion of the machine; Fig. 7 is an end view of the same; Figs. 8 and 9 are sectional views along the respective lines 8—8 and 9—9 of Fig. 6; Fig. 10 is a sectional view along the line 10—10 of Fig. 1; Fig. 11 is a front end view of the vacuum cup fruit holding means of the machine; Fig. 12 is a rear end view of the same; and Fig. 13 is a flattened projection of certain cam means.

The machine comprises a suitable frame 15 and operating means such as the motor 16. Connecting the motor with the various moving parts are suitable belts, shafts, gears, and the like, all of which are suitably connected for carrying out of my invention; and suitable cams are introduced for producing movements peculiarly suitable to the purposes of the invention. For the purpose of illustrating the invention I have shown it applied to the pitting of peaches.

In general the machine comprises peach receiving, peach centering, peach clamping, peach severing means, peach pit ejecting means, and suitable operating means for carrying out the various processes.

The means for receiving the peaches from the operator comprises a series of vacuum cups 17, Fig. 10, the outer ends of which are adapted to receive the peaches. These cups are mounted for slidable radial movement in a rotatable frame or wheel 18. The inner end of each cup is positioned in a vacuum chamber 19. The cups are slidably mounted in the rim of the wheel 18 which forms the outer walls of the chambers 19. Suitable means are provided for producing a partial vacuum in these chambers at proper times so as to allow air to be forced into the cups through the outer ends thereof and thus to hold firmly the peaches in the ends of the cups.

To produce the partial vacuum in the chambers 19 I prefer to provide a vacuum fan 20 which is operated by the motor 16 by means of the belt 21, the wheel 22 and the shaft 23. A vacuum conduit 24 passes from the fan to the side of a fixed annular plate 38, which is concentric with the wheel 18 and closes the side walls of the chambers 19. In the side of the plate 38 is an elongated curved opening 25 within the chamber 26 which forms the end of the conduit 24. As the wheel 18 rotates the chambers 19 successively register with the opening 25 and a partial vacuum is produced in the chambers and hence also in the corresponding vacuum cups 17.

Within each cup is axially mounted, for slidable radial movement, a rod 30 having a head 31, more or less pointed, on its outer end. In order to have the peaches in the most desirable position for pitting, the operator places the peach 27 in the end of the cup, the chamber 19 of which registers with the opening 25, with the stem depression of the peach against the pointed head of the rod 30 and against the open end of the cup. The air pressure thus holds the peach until it is in position to be received by the clamping means of the pitting machine. Cam operating means are provided for forcing the cup with the rod outwardly as the clamping position is being approached.

The cup is moved outwardly in the following manner: Fixed to the side of each cup is a pin 35 on which is rotatably mounted a wheel 36. This wheel normally runs in a groove 37 in the annular plate 38, and thus holds the cup in its inner position. As the cup moves from its peach receiving position, which is ordinarily the upper side of the wheel 18, the wheel 36 passes out of the groove 37 and onto a cam 40. This cam forces the cup outwardly just as it approaches the clamping position 29. At this time a lever 41, pivoted at 42 to the plate 38, has its upper end pushed outwardly by the wheel 36 as the wheel passes out of the groove 37; and as the cup moves outwardly and then passes outwardly beyond the cam 40 a cam 43, fixed to the wheel 18, forces the lower end of the lever 41 outwardly and thus forces the other end and the cup inwardly out of the way of the clamping means just as it reaches the clamping position 29 where the peach is to be grasped by the clamping means 28.

The rod 30 is carried outwardly by the cup by means of a spider 71 fixed within the cup and through which the rod 30 passes. This spider presses against the head 31 of the rod and forces it outwardly with the cup. As the cup is moved inwardly by the lever 41 the rod is held outwardly by a cam 33 which is fixed to the plate 38. In this way the peach is forced from the cup as it is grasped by the clamping means, and at this time the pointed end of the rod is pressing against the butt or outer end of the peach pit, and it is properly centered in this position by the clamping means, the clamping means comprising both centering means and clamping means which are adapted to properly position and hold the peaches for operation thereon.

The clamping means 28 comprises two coacting pairs of blades or knives 46, which are arranged to come together and clamp the peaches. The knives of each pair are rotatably mounted so that they can be rotated angularly towards and away from each other. The clamping means are arranged for rotation on a rotatably mounted wheel 53. I have shown six units of the clamping means, but the number is immaterial to the invention. As the clamping unit revolves around the axis of the wheel 53, moving from the position 74, the blades of each pair are separated as indicated; but just as they approach the position 29 the blades or knives are closed angularly grasping the peach as it is pushed from the cup by the rod 30. The knives cut into the pulp of the peach and press against the sides of the pit, centering it properly for the pitting operation.

Each of the knives has in its cutting edge a curved concave portion 56 which is adapted to receive the pit, and the pit is so positioned by the rod 30 that the outer ends of these curved portions press against the butt or outer end of the pit and thus hold the pit in the proper position. The knives are operated on, as hereinafter described by yielding cams, so that the knives can pinch firmly the pits without cracking them or injuring the knives, and the knives are thus held against the pits irrespective of their sizes or shapes. The inner ends of the pairs of blades are nearly in contact; but the outer ends are spaced somewhat, so that a thin wedge shaped section is cut from the peach and lies between the pairs of knives.

The clamping unit comprises also two coacting cups 45, which are arranged to clamp the peach on each side of the pairs of knives and thus to assist in holding the peach firmly in position. The cups, however, do not disturb the position of the pits with reference to the knives, as the pulp of the peaches yield before the pits are shifted in the clamping knives. Before the peaches are clamped the chamber 19 passes out from under the influence of the vacuum pump, and the air pressure in the chamber and the cup has materially increased by leakage, so that the peach is easily forced from the cup.

From the clamping position 29 the unit is passed to the saw 51 where the peach is to be severed completely in two. As the unit approaches the saw the pairs of knives are separated slightly laterally, so as to give room for the saw to operate between them. This movement is slight and the pulp of the peach yields sufficiently for the purpose. Also the resiliency of the cam operating means allows the knives to still hold the pit firmly in the proper position.

As the unit passes by the saw the peach is cut in two between the knives and the cups 45. As the saw is operated uniformly and continuously, any suitable operating mechanism may be used to connect it with the motor 16, such as the belt and shaft mechanism shown.

As the unit passes beyond the saw 51, suitable mechanism separates the knives and the cups laterally, and also opens somewhat the knives of each pair angularly. The knives however are left closed angularly sufficiently to hold the peach halves in their respective cups, as indicated in Fig. 4 at the position 54.

The unit now carries the peach halves into coaction with the pit removing knives 52. Each of these knives comprises a curved blade which is fixed to an operating rod 48. As the peach halves approach these knives 52 the knives are rotated so that the cutting edges move in the direction the peach halves are moving, and as it rotates each knife 52 scoops the adjacent pit out of the peach pulp. The form of each knife, in conjunction with its motion relative to the half pit, is such that it neatly and effectively cuts the half pit out of the pulp as the pulp is being held by the cups 45 and the partly opened knives 46. As indicated the knives 52 are arcuate and pointed towards their ends, the radius of the arc being comparable with the radius of the peach pit. Roughly the arcs formed by the knives are half circles. The knives are formed of thin resilient steel, so that they yield sufficiently if they press against the pit, and they are properly positioned with reference to the pits by the mechanism hereinafter described.

During the operation of the saw 51 on the peaches the particles of pulp and pits removed by the saw pass downwardly through the open conduit 55. As the pits are removed as described they drop down into an opening or a conduit 56, the mechanism of the knives being protected by a housing 57. As the units travel onwardly, the knives 46 are again closed angularly to completely sever any uncut portions and to remove particles of pits or pulps. They are then opened angularly and held open. The pitless half peaches or the pulp then drops downwardly into a suitable conduit 58.

While the exact mechanism used for operating the various cups, knives and other elements, is not a necesary part of my invention, yet certain operating features are new, especially in connection with the elements operated on, and hence should be specifically described.

The wheel 18 is mounted on a rotatable shaft 60, which shaft is operated by a gear 61 and a worm 62, the speed of the wheel being thus greatly reduced, preferably to a speed of about one rotation every five or six seconds. The worm is operated by a shaft 63 and the meshing bevel gears 64. One of these gears is fixed to the shaft 63 and the other to the shaft 65 which is operated by the motor by means of a belt 67 operating on the pulleys 68 and 69 and through a reduction gearing in the housing 66. This mechanism operates the wheel 18 continuously and uniformly.

The operation of the vacuum cups has been substantially described up to the time of delivering the peach to the clamping apparatus. As the peach is grasped by the cups 45 and the blades 46, the end of the rod 30 passes off of the cam 33, and the spring 75 forces the rod 30 inwardly to its normal position. The spring acts against the collars or spiders 76 and 77. The spider 76 is slidably mounted in the vacuum cup and is fixed to the rod, and the spider 77 is fixed to the cup. At this time the lever 41, acting on the wheel 36, forces the cup inwardly, and the wheel 36 again passes into the groove 37 and remains therein until another peach is in position in the cup to be delivered to the clamping means.

The centering and clamping means 28, together with their operating means, are mounted on bars 53'. These bars are fixed at their ends to the peripheries of the wheels 53. The wheels are rotatably mounted with the shaft 50 to which they are fixed. The shaft 50 is supported in bearings 51' and 55' mounted on the frame 15. The shaft 50 is operated by the shafts 65 and 65' through reduction gearing in the housing 50'.

The cams for operating the clamping means are mounted on the peripheries of the annular frames 39, which are concentric with the wheels 53. These frames are fixed to the main frame 15. The cams for moving the clamping means laterally are mounted on the beams 52'. These beams have offset portions 54' to avoid the clamping means as they pass by. The cams for opening and closing the clamping or centering means 46 angularly are mounted on the peripheries of the annular frames 39. These cams are resilient or are resiliently mounted on the frame by any suitable means, such as by means of springs 102'.

The right hand or rear set of cams for moving the clamping means laterally are indicated diagrammatically in Fig. 13. This figure may be considered as the flattened projection of these cams as shown in Fig. 4 looking outwardly from the shaft 50.

The clamping cups 45 are fixed to the inner ends of rods 80, which are slidably mounted on the bearings 72 and 73 fixed to the beams 53' of the wheels 53. Fixed to these rods 80 are the respective bars 81, and each bar carries a rotatably mounted wheel 82. These bars 81 are slidably mounted on fixed guide rods 110, fixed to the supports 72 and 73. The position of each cup is determined by the position of its associated wheel 82, and the wheel is operated by cams 83 or 86. These cams are preferably T-shaped, and the wheels run on the projecting central flange. The spring 84, mounted on each guide rod 110, tends at all times to force the cups towards each other.

Starting from the position 74 of Fig. 4, the cups are closed; but on approaching the clamping position 28 the wheel 82 of each cup passes onto its cam 83 or 86, Fig. 1. The cams force the cups gradually outward ready to receive the peach. As the unit passes onwardly the wheels pass off of the lower ends of the cams and allow the cups to be forced inwardly by the springs 84 to clasp the peach, the peach in the meantime having been properly positioned by the knives 46 as hereinafter described. The cups are then held closed by the springs while the peach is being cut by the saw 51 and until the unit approaches the pitting knives 52. The cups are then forced open by the knives, as hereinafter described, and the half pits are removed by the pitting knives 52. The wheels 82 then pass onto the cams 85, see Figs. 4 and 13, and these cams hold the cups apart and thus the peach pulp halves are allowed to drop out of the cups into the conduit 58. After passing beyond the influence of the cams 85 the cups are again forced together by the springs 84.

The knives 46 are operated in a somewhat similar way. Each knife is mounted on the inner end of a rod 90, each knife being braced by a link 91. These rods 90 are slidably mounted in the bearings 72 and 73. Each right and left hand pair of rods 90 are operatively connected by meshing pinions 92. Fixed to the rods 90 of each pair of rods is a support 90' and rotatably mounted on this support is a wheel 93 which is adapted to be operated by a cam 94 to move the pairs of knives laterally, or transversely. The knives of each pair are also rotatable angularly towards and away from each other, but, ignoring for the moment the rotary movement, the lateral movement is as follows:

Starting from the position 74, as the position 29 is approached the wheel 93 of each pair of knives passes onto its cam 94, and the pairs of knives are forced towards each other and held so until the peach is grasped. The wheel 93 of each pair of knives is then operated by the cam 95, so as to separate the pairs slightly so as to allow the saw to cut freely between them. The wheels are then operated by cams 58 which separate laterally the pairs of knives 46 sufficiently to allow the pitting knives 52 to pass between them. Just as each forward pair of knives 46 passes its associated pitting knife the wheels 93 pass off of the ends of the cams 58, and the springs 84 force the cups and pairs of knives 46, with the half peaches between, towards each other until the wheels 93 strike the cams 89. This cam is adjusted by the screw 111 so as to position the peach halves properly to receive the pitting knives.

After the pitting, the knife pairs are again opened somewhat by the cam 112 until the peach pulps drop out of the cups, the knives having been opened angularly sufficiently to allow this. The pairs of knives are then substantially closed by the cams 113.

However, during the cycle the knives are rocked on the rods 90. When in the position 74 the knives of each pair are separated angularly as indicated. Fixed to the outer end of one of each pair of rods 90 are arms 96, 97 and 98, Fig. 3; and the arm 98 carries a wheel 99. When in the position 74 the wheel 99 coacts with a cam 100, and holds the operatively connected pairs of knives separated. When the unit 28 approaches the clamping position 29, the wheel 99 passes off of the end of the cam 100, and the arm 97 strikes the cam 101. These cams are fixed to the frame of the machine while the arms and rods revolve around the axis of the wheel 39. As the arm 97 strikes the cam 101 the rods are rotated thereby so as to close the knives on the peach which is being received. The arm 96 then passes into coaction with the cam 102, and the knives are forced into the pulp of the peach and against the pit, the cam 102 yielding somewhat so that the knives resiliently hold the pit. The peach is thus held firmly in conjunction with the cups 45 which then close on the peach, until the peach is sawed in two, the pairs of knives having separated slightly to make room for the saw.

As the divided peach approaches the pit removing position 54, the arm 96 passes along the cam incline 103, and the arm 97 strikes the cam 104 and separates the knives angularly somewhat, as indicated in Fig. 4, but leaves them closed sufficiently to hold the peach half firmly in the associated cup. The arm 96 then passes onto the cam 105, after the pitting operation, again closing the knives angularly temporarily. The arm 97 then strikes the cam 106, rotating the rod 90 so that the wheel strikes the end of the cam 100, thus rotating the rod and the arms to the positions indicated and holding the knives separated angularly.

The general process is as follows: From the position 74, the unit descends and the knives and the cups are closed on the peach, the knives being pressed into the pulp until the pit is firmly held thereby. The knives are then separated slightly laterally, and the peach is cut entirely in two pieces by the saw 51. The unit then passes to the pitting knives 52, the knives 46 being separated laterally sufficiently for the knives 52 to pass between. Just as the rotating pitting knives are ready to pass into the half peaches, the half peaches are forced together slightly so as to be properly positioned for the pitting. After the pitting the knives 46 are separated laterally sufficiently to allow the pitting knives to pass between; the knives are closed angularly to neatly trim and clean the severed faces of the peach halves; the knives 46 are then separated angularly; the pulp halves drop out and the cups and the pairs of knives are closed laterally.

The pitting knives 52 are rotated continuously and uniformly, and at such speed as is necessary to properly perform the operation. The knife operating rods 48 are geared together by the pinions 47, and one of the rods is operated by the bevel gears 64' and the shaft 65. Each pitting knife moves in the direction that the peach half is moving during the operation. As the peach half is moving past the stationary axis of the knife rod as the knife rotates, the path of motion of the central portion of the knife is necessarily materially greater than the corresponding dimension of the peach pit.

The member 115, Fig. 4, is a safety guide means which passes between the knives 46 as they approach the saw, to insure the separation of the knives sufficiently to clear the saw. Pins 108 fixed to each vacuum cup plays in a slot 109 and thus prevents the cup from rotating. It is to be understood that various modifications might be made in these and other details of the machine, by those skilled in the art, without departing from the spirit of my invention as disclosed by the following claims.

I claim as my invention:

1. In a peach pitting machine, peach pitting mechanism, means for receiving peaches and delivering them to the pitting mechanism, said means comprising a rotatably mounted support, a receiving cup supported thereon, said cup having an open end adapted to receive a peach, and means for reducing the air pressure in the cup.

2. In a machine as claimed in claim 1, including means for sliding the cup radially with reference to the support.

3. In a fruit pitting machine, means for receiving fruit comprising a rotatably mounted wheel having a plurality of chambers spaced apart and positioned adjacent the periphery of the wheel, a fruit receiving cylinder slidably mounted radially in the periphery wall of each of the chambers, the ends of the cylinders being open, and means for varying the air pressure in each chamber as the wheel rotates.

4. In a machine as claimed in claim 3, including a rod axially and slidably mounted in each cylinder, means for forcing the cylinder and the rod outwardly, and resilient means tending to force the rod inwardly.

5. In a peach pitting machine, means for centering the peaches for operation thereon, said means comprising two pairs of flat blades serving as knives, the knives of each pair lying substantially in the same flat plane, the two pairs being substantially parallel and closely spaced during operation, means for forcing the opposing edges of the knives of each pair towards and away from each other, and means for forcing the two pairs laterally towards and away from each other.

6. In a machine as claimed in claim 5, in which said former forcing means are yielding, and said knives have pit centering recesses in their opposing edges.

7. In a machine as claimed in claim 5, including peach clamping means comprising a pair of cups with their concave sides facing each other and the knives, and on opposite sides of the knives, and means for forcing the cups towards and away from each other.

8. In a machine as claimed in claim 5, in combination with means for clamping the peaches comprising a pair of cups facing the knives and adjacent thereto, means for cutting the peach into two halves, and means for separating the knives of each pair sufficiently to release the half pits.

9. In a device of the character described, the combination with means for feeding fruit along a predetermined path, of flesh slicing means in said path for engaging the fruit and progressively effecting slicing of the flesh to the pit thereof, the pit of the fruit serving as a stop for said slicing means that engage and center the pit relative thereto, means for embracing the flesh of the fruit to the line of slicing without affecting the position of the pit relative to said slicing means, and means for severing the pit of the fruit substantially along the line of slicing while held by said slicing means.

10. In a device of the character described, the combination with means for feeding fruit along a predetermined path, of flesh slicing means in said path for engaging the fruit and progressively effecting slicing of the flesh to the pit thereof, the pit of the fruit serving as a stop for said slicing means that engage and center the pit relative thereto, means for severing the pit of the fruit substantially along the line of slicing while held by said slicing means, and means for removing the severed pit from the sliced parts of the flesh.

11. In a device of the character described, the combination with means for feeding fruit along a predetermined path, of flesh slicing means in said path for engaging the fruit and progressively effecting slicing of the flesh to the pit thereof, the pit of the fruit serving as a stop for said slicing means that engage and center the pit relative thereto, means for embracing the flesh of the fruit to the line of slicing without affecting the position of the pit relative to said slicing means, means for severing the pit of the fruit substantially along the line of slicing while held by said slicing means, and means for removing the severed pit from the sliced parts of the flesh.

12. In a device of the character described, the combination with means for feeding fruit along a predetermined path, of flesh slicing means in said path for engaging the fruit and progressively effecting slicing of the flesh to the pit thereof, the pit of the fruit serving as a stop for said slicing means that engage and center the pit relative thereto, means for embracing the flesh of the fruit to the line of slicing without affecting the position of the pit relative to said slicing means, means for severing the pit of the fruit substantially along the line of slicing while held by said slicing means, means for removing the severed pit from the sliced parts of the flesh, and means for separating said embracing means for discharging the pitted flesh therefrom.

13. In a device of the character described, the combination with means for feeding fruit along a predetermined path, of flesh slicing means in said path for engaging the fruit and progressively effecting slicing of the flesh to the pit thereof, the pit of the fruit serving as a stop for said slicing means that engage and center the pit relative thereto, means for embracing the flesh of the fruit to the line of slicing without affecting the position of the pit relative to said slicing means, means for severing the pit of the fruit substantially along the line of slicing while held by said slicing means, means for removing the severed pit from the sliced parts of the flesh, means for separating said embracing means for discharging the pitted flesh therefrom, and means for operating said instrumentalities in timed sequence for flesh slicing, pit severing, pit removing, and discharging of the pitted halves in a progressive continuity of operations.

14. In a fruit pitting machine, fruit centering means arranged to act on the pit or core of the fruit, fruit clamping means arranged to act on the pulp of the fruit, the centering means being positioned between the members of the clamping means and constituting the pulp severing means to divide the fruit pulp into halves, and means for cutting the fruit core into two similar halves.

15. In a fruit pitting machine, fruit centering means arranged to act on the pit or core of the fruit, fruit clamping means arranged to act on the pulp of the fruit, the centering means being positioned between the members of the clamping means and constituting the pulp severing means to divide the fruit pulp into halves, means for cutting the fruit core into two similar halves, and means for ejecting the half core or pit portion from each half of the fruit.

INGOLF E. SNEVA.